Dec. 12, 1939.    F. L. HUMPHREY    2,183,455
COMBINED BASKET AND STAND THEREFOR
Filed Oct. 3, 1938    2 Sheets-Sheet 1

Frank L. Humphrey
INVENTOR
BY Victor J. Evans & Co.
ATTORNEYS

Dec. 12, 1939.   F. L. HUMPHREY   2,183,455
COMBINED BASKET AND STAND THEREFOR
Filed Oct. 3, 1938   2 Sheets-Sheet 2
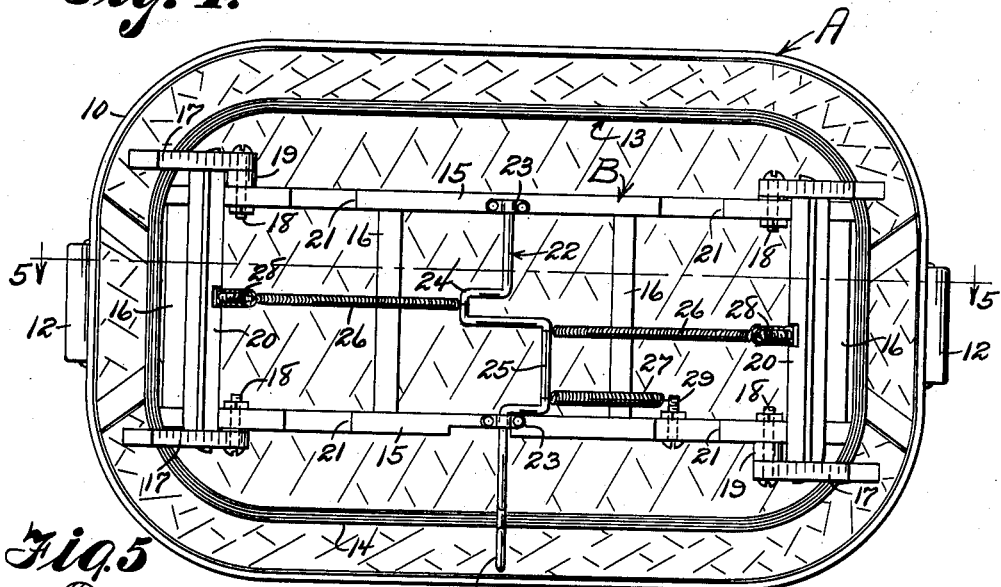
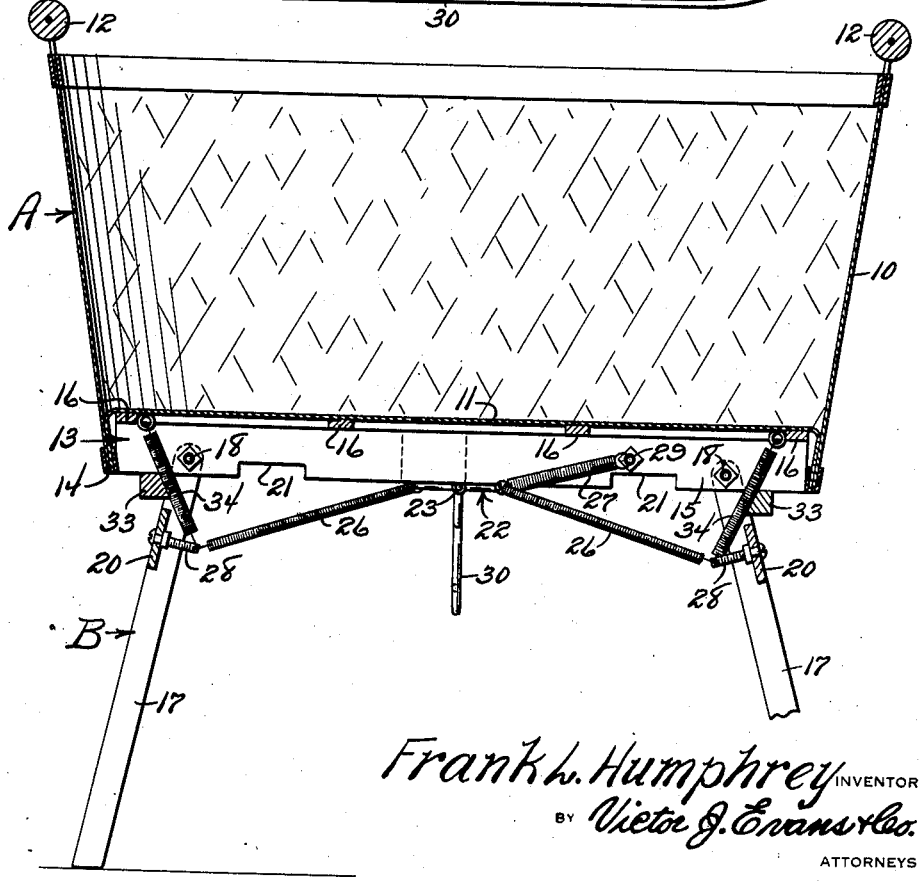
Frank L. Humphrey INVENTOR
BY Victor J. Evans & Co.
ATTORNEYS Patented Dec. 12, 1939

2,183,455

UNITED STATES PATENT OFFICE 2,183,455

COMBINED BASKET AND STAND THEREFOR

Frank L. Humphrey, Wichita, Kans.

Application October 3, 1938, Serial No. 233,071

2 Claims. (Cl. 248—150)

The invention relates to a clothes basket and more particularly to a combined basket and stand therefor.

The primary object of the invention is the provision of a structure of this character, wherein the basket has fitted therewith supporting legs, these being foldable when not in use so as not to interfere with the bringing of the basket to a rest position upon a table, foundation or other support, the legs being received in a space created by having the bottom of the basket in-struck for the major extent thereof with the result that the legs are inwardly of the lowermost edges of the basket, while the cross pieces for the abutment of the legs therewith when extended being effective as rest rails for the basket.

Another object of the invention is the provision of a structure of this character, wherein the legs can be extended with ease and when both hands of the user of the basket are engaged for holding the latter in a carrying position.

A further object of the invention is the provision of a structure of this character, wherein the legs may be drawn back to a folded position while the hands of the user of the basket are engaged in holding the same by the handles for such purpose.

A still further object of the invention is the provision of a structure of this character, which is simple in its make-up, thoroughly reliable and effective in operation, comparatively light in weight yet strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 4 is a view similar to Figure 1 showing the legs of the stand extended.

Figure 5 is a sectional view on the line 5—5 of Figure 4 looking in the direction of the arrows.

Similar reference characters indicate corresponding parts throughout the several views in the drawings.

Figure 1:
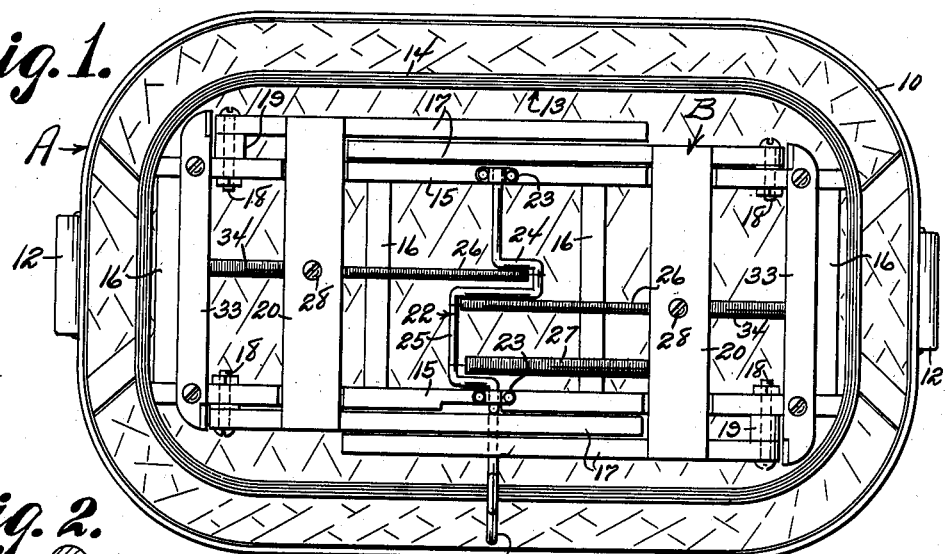
Figure 1 is a bottom plan view of the basket and stand therefor constructed in accordance with the invention, the legs of the stand being in folded position.

Referring to the drawings in detail, A designates generally the basket and B the stand therefor, respectively. The basket A comprises preferably an elongated body 10 made from any suitable material open at its top and at its bottom closed, the bottom being indicated at 11. At opposite ends of the body 10 of the basket A are loop handles 12 for the carriage of the basket by a person.

The bottom 11 is in-struck from its under side to form a space 13 extending inwardly from the lowermost edge 14 of said body and built into this space 13 is a frame involving the spaced parallel longitudinal rails 15 and cross transversely disposed rails 16, respectively, these being united in any desirable manner, and such frame involving the rails 15 and 16 is made secure to the body 10 to be wholly within the space 13.

The frame including the rails 15 and 16 is a part of the stand B and to the rails 15 are swingingly connected foldable legs 17, the pivots 18 being passed through the said legs and the rails 15 and in association therewith have the spaces 19 so that the legs will be arranged in reversely offset relation to each other to allow for the proper folding of these legs without interference one with the other and with the frame constituted by the rails 15 and 16. The legs 17 of the stand B are preferably connected with the frame constituted by the rails 15 and 16 close to opposite ends of said frame while included with said legs are the cross pieces 20, these on the folding of the legs being accommodated in notches 21 provided in the rails 15 so that the said legs 17 will pass into the space 13 to lie substantially flush with the bottom edge 14 of the body 10 of the basket when in a folded condition.

Arranged intermediate of the frame constituted by the rails 15 and 16 is a cranked shaft 22 being journaled in bearings 23 fixed to the said frame at the longitudinal rails 15 thereof and this shaft is formed with reversely extended cranks 24 and 25, respectively, each having connected therewith a coil spring 26, while connected with the crank 25 in addition to the spring 26 is a second coil spring 27, the spring 26 being also connected with anchoring screws 28 fixed in the cross pieces 20 of the legs 17 while the spring 27 is connected to an anchoring screw 29 fixed in one longitudinal rail 15.

The shaft 22 terminates at one side of the body 10 of the basket in a crank handle 30, being also formed with the bights 31 and 32, respectively, so that this shaft 22 will clear the legs 17 when folded and also the lowermost edge 14 of the body 10 of the basket A and to avoid interference in the working of the shaft, which, on the turning thereof, operates for the folding and unfolding of the legs 17.

The frame at the longitudinal rails 15 thereof has fixed thereto cross members 33 in the form of rails functioning as abutments for the legs 17 when extended to limit the opening movement thereof and also rests for the basket when the legs 17 are in folded condition whereby the basket A can be supported upon a table, a foundation or other support without being supported by the stand B or the legs thereof when extended.

Connected to the rails 16 of the frame of the stand B are coiled springs 34 which are also connected with the anchoring screws 28. The arrangement of the springs 26, 27 and 34 and the character thereof assures the quick unfolding of the legs 17 and the folding of said legs when a slight movement is imparted to the crank handle 30 at one side of the body 10 of the basket, this being effected by the limb of a user of the basket when holding the basket in the hands of such user and elevated from a rest position of the basket body.

To extend the legs 17 when folded, the user of the basket, when holding the latter, merely has to make contact with the crank handle 30, this being effected by the knee of such user and through a slight push upon this handle alters the direction of pull of the spring 27 which exerts a tension on the crank 25 causing the bight 32 in the shaft 22 to give to the legs 17 a sharp sudden downward thrust. This thrust imparted by the spring 27 plus the pull of gravity causes the legs 17 to swing downwardly and outwardly overcoming the pull of the springs 34, the latter serving a double purpose of holding the legs out when they are extended and also change their direction of pull as they swing upward holding the legs up and in a folded condition. The function of the springs 26 is to start the legs in their upward swing until the springs 34 change their direction of pull. The springs 34 in the functioning thereof pass from one side of the axis of swing of the legs 17 to the other side thereof. The spring 27 serves both to make a downward thrust on the legs 17 to extend them through the instrumentality of the bight 32 and also when it changes the direction of its pull serves to lock the lever arm or handle 30 in its upright position from which it has to be pushed by the knee of the user. The legs 17 when folded come within the space 13 created by the instruck bottom 11 of the basket.

Figure 2:
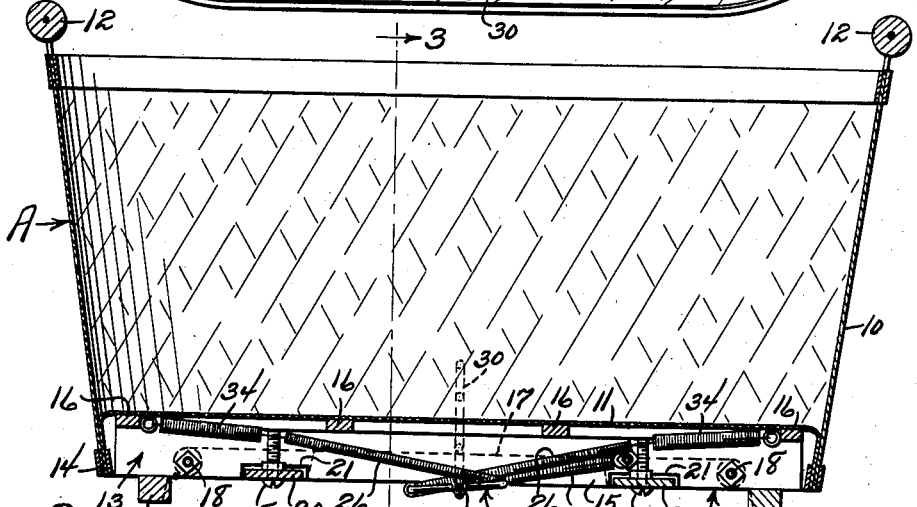
Figure 2 is a vertical longitudinal sectional view thereof.
Figure 3:
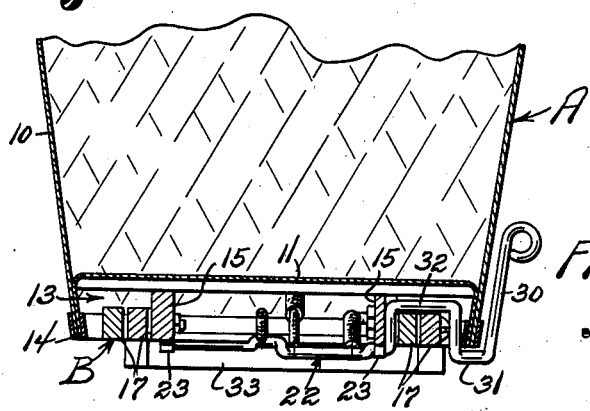
Figure 3 is a fragmentary sectional view taken approximately on the line 3—3 of Figure 2.

The position of the crank handle 30 close to one side of the body 10 of the basket A makes the said handle convenient for actuation by the knee or limb of a person when the user of the basket is holding it in the hands for the carrying thereof. The crank handle 30 and its bights 31 and 32 are disposed at substantially right angles to the lay of the cranks 24 and 25 in the shaft 22, this being apparent from Figures 1, 2 and 5 of the drawings.

What is claimed is:

1. The combination of a basket body, a frame fixedly held within the body, swinging legs pivoted to said frame and movable to folded and unfolded positions, a double cranked shaft journaled on the frame between the swinging legs and having a crank handle exteriorly of the body at one side thereof, springs connected with the legs and with different cranks of the said shaft for starting the legs toward folding position, springs connected with the body and with said legs for sustaining the latter when unfolded and also for changing their direction of pull when moving to folded position, and a spring connected to one of the cranks of the shaft and to the frame for changing the direction of pull of the second-named springs and exerting a sudden sharp downward thrust to the legs by the passing of the activity of the said second-named springs from one side of the axis of swing of the legs to the other side thereof.

2. The combination of a basket body, a frame fixedly held within the body, swinging legs pivoted to said frame and movable to folded and unfolded positions, a double cranked shaft journaled on the frame between the swinging legs and having a crank handle exteriorly of the body at one side thereof, springs connected with the legs and with different cranks of the said shaft for starting the legs toward folding position, springs connected with the body and with said legs for sustaining the latter when unfolded and also for changing their direction of pull when moving to folded position, a spring connected to one of the cranks of the shaft and to the frame for changing the direction of pull of the second-named springs and exerting a sudden sharp downward thrust to the legs by the passing of the activity of the said second-named springs from one side of the axis of swing of the legs to the other side thereof, and means associated with the legs to limit the folding and unfolding positions thereof.

FRANK L. HUMPHREY.